United States Patent [19]

Spohn

[11] Patent Number: 4,907,690
[45] Date of Patent: Mar. 13, 1990

[54] DEVICE FOR REMOVING A COMPACTED OIL SAND LAYER FROM A CONVEYOR BELT

[75] Inventor: Lawrence M. Spohn, Fort McMurray, Canada

[73] Assignee: Alberta Energy Company, Ltd. et al., Calgary, Canada

[21] Appl. No.: 233,737

[22] Filed: Aug. 19, 1988

[51] Int. Cl.$^4$ ............................................. B65G 45/00
[52] U.S. Cl. ................................................... 198/498
[58] Field of Search ........................ 198/498, 501, 497

[56] References Cited

U.S. PATENT DOCUMENTS

| | | | |
|---|---|---|---|
| 3,047,133 | 7/1962 | Searles | 198/498 |
| 3,430,758 | 3/1969 | Searles | 198/498 |
| 3,540,573 | 11/1970 | Kelm | |

FOREIGN PATENT DOCUMENTS 0208126  3/1984  German Democratic Rep. ................................. 198/498
0253649  1/1970  U.S.S.R. ............................. 198/498

Primary Examiner—Robert J. Spar
Assistant Examiner—Lyle Kimms
Attorney, Agent, or Firm—E. Peter Johnson

[57] ABSTRACT

A device is provided for shearing an adherent layer of oil sand for removal from a major surface of a moving conveyor belt. A v-shaped formation of linearly-arrayed, spaced-apart, rotatable discs is suspended above or beneath the belt and brought into pressing engagement with the oil sand layer. As the discs rotate with the advancement of the belt, they function to cut through the layer, loosening it from the belt so it separates therefrom.

1 Claim, 2 Drawing Sheets

DEVICE FOR REMOVING A COMPACTED OIL SAND LAYER FROM A CONVEYOR BELT

FIELD OF THE INVENTION

The present invention relates to a device for removing an adherent layer of hardened, compacted oil sand from a conveyor belt.

BACKGROUND OF THE INVENTION

The present invention has been developed to overcome problems associated with the transportation of oil sands from a mine site to a hydrocarbon extraction plant. The oil sand is transported by an endless belt conveyor system.

In the commercial open-pit oil sand-mining operation of the present assignees, carried out in the Athabasca region of Northern Canada, about 300,000 tonnes per day of oil sand is mined. The mined sands are conveyed to a distant extraction plant where bitumen is recovered therefrom using the hot water extraction process. Typically, the oil sand must be transported over distances ranging up to 5.5 km.

As-mined oil sand comprises bitumen, water, quartz sand and clays. Oil sand 'ore' is classified as rich, average or lean depending upon its bitumen content. An average ore analysis could be 84 wt. % sand; 11 wt. % bitumen; and 5 wt. % water. Oil sand will vary in its physical properties depending upon its ore grade.

In its physical characteristics, oil sand is both abrasive and cohesive due to its quartz and bitumen content respectively. As it dries, oil sand, because of its clay content, hardens but continues to remain adhesive. Additionally, external factors such as fluctuations in ambient temperatures, or density variations due to snow or rainfall pick-up will serve to further alter the adhesivity of the oil sand.

The oil sand is deposited onto the conveyor train as an unevenly distributed load. Under its own weight, and as a consequence of vibration in the conveyor system, the underlying oil sand layer immediately adjacent the belt becomes compacted. The hardened oil sand in this layer builds up into a consolidated mass of several centimeters thickness. After the load is discharged, this layer remains on the belt. The layer becomes further compacted as the belt travels over the tensioning snub pulley of the conveyor under compressive stress. This hardened, compacted, adherent oil sand layer is hereinafter referred to as the 'oil sand layer'.

In addition to the adhesive layer on the load-carrying surface of the belt, some oil sand also accumulates as a similar layer on the underside surface of the belt loop. This is oil sand which has dropped onto the underside surface on the return leg.

Typically, the oils and layer will build up until it reaches a thickness of about ½". Then, what is referred to as 'peeling' from the downwardly facing surface of the belt will take place; more particularly, one oil sand layer will separate or break away from another, with the 'peel' falling onto the ground beneath. Because peeling does not take place until the layer reaches a considerable thickness, it will be readily appreciated that the weight of the build-up prior to peeling significantly and deleteriously affects conveyor power draw requirements. Furthermore, serious removal problems are posed by the volume of deposited peel which has to be removed from beneath the conveyor belts. For example, at the present assignees' commercial plant described supra, four front-end loaders equipped with power rakes are employed around the clock to remove peel. It will be noted too that, when using these rakes, it is not uncommon for the conveyor belt support frames to experience damage.

During the summer months, the adhesivity of the oil sand layer to the belt increases and the problem becomes more severe.

It is undesirable for the belt to be continuously carrying dead tonnage. In addition, the carrying of this dead weight can be responsible for untracking of the belt.

At present, the prior art approaches to solving this problem have focused either on prevention of build-up of oil sand on the belt, by an application of diesel oil to the surface thereof, or jetting water (or water/glycol, in the winter months) against the layer, to remove it. The disadvantages inherent with the first solution are that the diesel oil is expensive and destructive of the belts. It also creates a fire hazard problem. The latter solution is not only ineffective but is also expensive, involving the expenditure of several million dollars per annum on glycol alone.

There exists, therefore, a need for a better method for removing the compacted oil sand layer from the belt. It is desirable that the method eliminate the requirement for the application of costly solutions, be effective on an all-year-round basis, and be inexpensive.

In the prior art, mechanical devices have been suggested for cleaning conveyor belts. See for example those disclosed in U.S. Pat. Nos. 3,047,133 and 3,430,758, issued to A. Searles, and 3,540,573, issued to J. K. Keim. However, these prior art devices would not be effective to handle oil sand. They would either wear out rapidly because of the abrasive nature of the oil sand or would become clogged by it.

SUMMARY OF THE INVENTION

In accordance with the present invention, it has been discovered that a layer of oil sand may successfully be removed from a moving conveyor belt by bringing a specific device into pressing engagement therewith, the device being functional to shear and loosen the oil sand layer.

More specifically, the device comprises a pair of linear arrays of spaced apart, rotatable discs arranged in a v-shaped formation. The discs are positioned at an angle to the direction of travel of the belt. Preferably the apex of the formation is positioned at the belt centre. As the belt advances, the discs are rotated and the peripheral edges thereof cut the hardened material from the belt. The discs are generally dish-shaped with the concave faces thereof directed toward the upstream end of said belt. The disc assemblies are mounted on a frame. Means, associated with the frame, are provied for suspending the frame and bringing the discs into pressing engagement with the oil sand layer at the desired contact pressure.

The device is functional to remove the oil sand layer from either the topside or underside of the belt.

Broadly stated, the invention is a device for shearing an adherent layer of oil sand for removal from a major surface of a moving conveyor belt which comprises: applying a v-shaped formation of linear arrays of spaced apart rotatable discs to the belt to shear the layer, thereby loosening it from said belt.

DESCRIPTION OF THE PREFERRED EMBODIMENT

Figure 1:
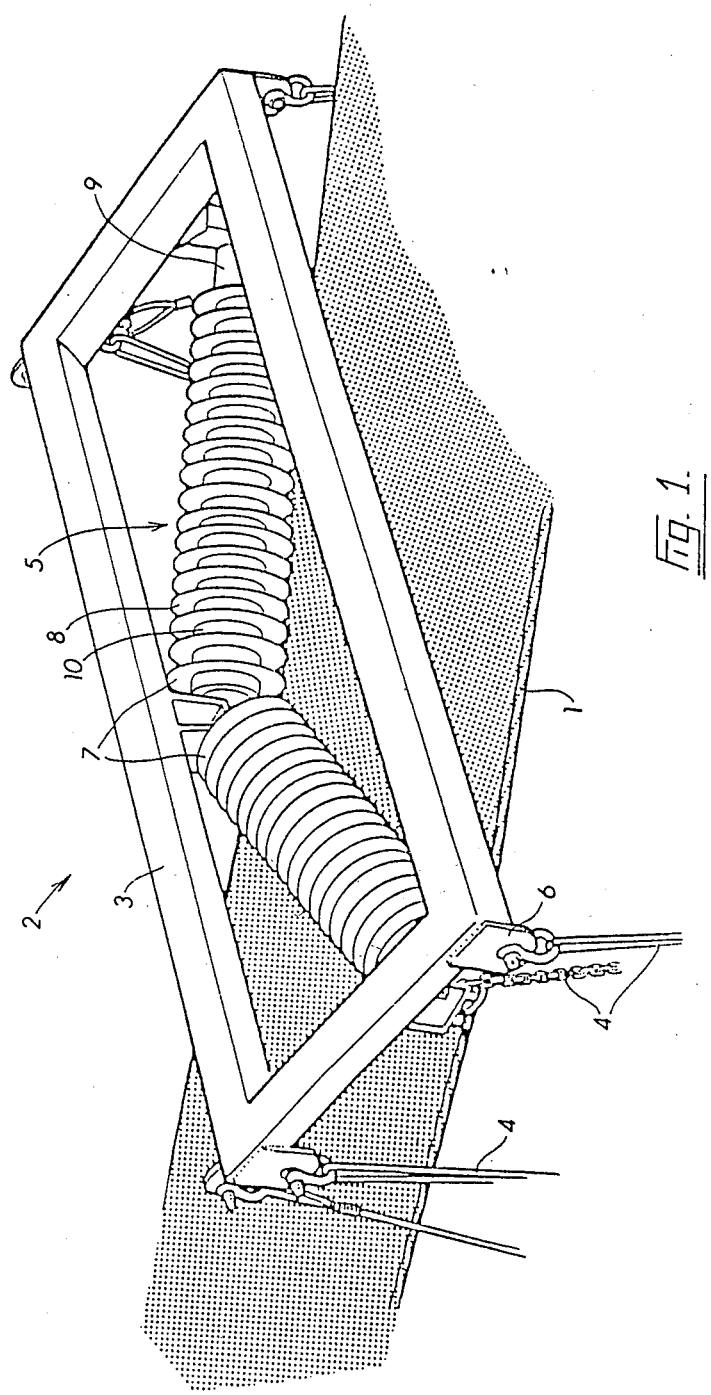
FIG. 1 is a perspective view of the device utilized in the practice of the present invention.
Figure 2:
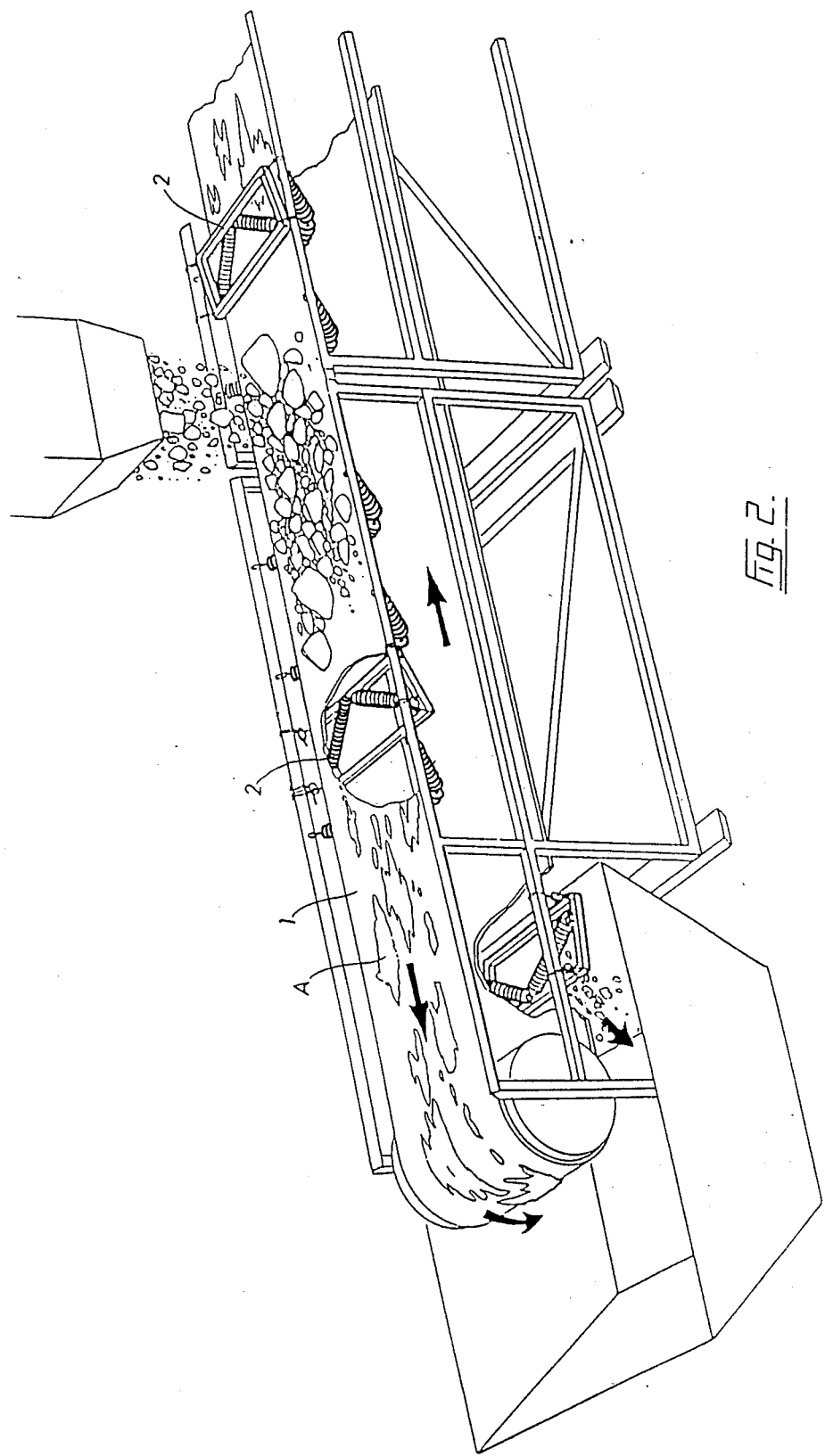
FIG. 2 is an illustration of the device of FIG. 1 in operation.

Having reference to the accompanying drawings, a device is provided for loosening a layer A of oil sand from a moving conveyor belt 1. More particularly, a cleaning device 2, as shown in FIG. 1, is suspended and brought into pressing engagement with the layer A. The device is functional to cut through and loosen the adherent layer so that it drops off the belt.

Cleaning device 2 includes a frame 3, winch means 4 for raising and lowering the frame 3, and a pair of disc arrays 5 mounted on the frame 3 for cutting through the oil sand layer A.

Frame 3 is of a generally rectangular configuration and is sized to extend across the conveyor belt 1. Brackets 6 are mounted at the corners of frame 3 for connection with the winch means 4.

The winch means 4 (not illustrated in their entirety) are provided to raise and lower frame 3, thereby suspending it and bringing it into pressing engagement with the layer A.

A v-shaped formation 7 of linear arrays 5 are spaced apart, rotatable discs 8 is utilized. More specifically, a pair of diagonally oriented rotatable shafts 9 are mounted on the frame 3. The inner ends of the shafts 9 meet at an apex at the centre of the belt 1. The discs 8 are rotatably mounted on the shafts 9. Each disc 8 has a generally dish-shaped configuration with the concave face of the disc 8 facing upstream. As the belt 1 advances, the discs 8 are rotated and their circumferential edges cut into the oil sand layer A to loosen it from the belt 1.

Spacers 10 are mounted on the shafts 9 between the discs 8, to enable loosened dirt to be expelled therefrom by centrifugal action.

When employed on the load-carrying surface of the belt, the cleaning device 2 is functional to direct the loosened oil sand into the centre of the belt where it forms part of the load.

For use on the underside of the belt, the device is used in conjunction with an angled doctor blade, positioned transversely of the belt, which directs the oil sand to the side.

The embodiments of the invention in which an exclusive property or privilege is claimed are defined as follows:

1. A device for shearing an adherent layer of oil sand for removal from a major surface of a moving conveyor belt having upstream and downstream ends comprising:
    a frame;
    a pair of linear arrays of spaced apart, rotatable, metal discs arranged in a v-shaped formation with the apex of the formation being positioned substantially at the centre of the belt, said discs being generally dish-shaped and having their concave faces directed toward the upstream end of said belt; and
    means, associated with said frame, for suspending said frame and bringing the discs into pressing engagement with the oil sand layer at the desired contact pressure.

* * * * *